United States Patent

Micheron et al.

[11] 4,176,345
[45] Nov. 27, 1979

[54] REFLECTING ELECTROSTATIC DISPLAY CELL

[75] Inventors: François Micheron; Jean-Luc Bruneel, both of Paris, France

[73] Assignee: Thomson-CSF, Paris, France

[21] Appl. No.: 866,340

[22] Filed: Jan. 3, 1978

[30] Foreign Application Priority Data

Jan. 4, 1977 [FR] France .................................. 77 00077

[51] Int. Cl.$^2$ .............................................. G08B 5/00
[52] U.S. Cl. ................................... 340/373; 310/378.2
[58] Field of Search ............... 340/373, 324 R, 378 R, 340/366 R

[56] References Cited

U.S. PATENT DOCUMENTS 3,648,281  3/1972  Dahms .................................. 340/373

Primary Examiner—Harold I. Pitts
Attorney, Agent, or Firm—Cushman, Darby & Cushman

[57] ABSTRACT

A reflecting electrostatic display cell comprising a dihedral block having two surfaces departing from an edge, two electrodes extending onto respectively said two surfaces, and an electret sheet secured to said edge. One electrode and one face of the sheet are painted with a first color; and the second electrode and the remaining surface of the sheet are painted with a second color. Under the control of a temporary voltage applied between the electrodes, the electret sheet sticks to one electrode, the cell thus presenting one of the two colors. Under the control of a temporary reversed voltage, the electret sheet sticks to the other electrode, the cell thus presenting the other colors.

16 Claims, 10 Drawing Figures

REFLECTING ELECTROSTATIC DISPLAY CELL

The invention relates to electrostatic display cells for constructing unit elements which can assume one of two stable, visually distinct states under the action of a temporary electric signal. The cells can be assembled to form display devices having all desired shapes.

It is known to construct bistable display devices comprising a sheet mounted on a pivot and provided with a permanent magnet. An electromagnet acts on the permanent magnet and pivots the sheet, bringing it into one of two stable positions. The sheet remains in position after the electromagnet is deenergized. The device, however, uses up considerable energy at each switchover.

It is also known to construct a display device comprising a sheet of aluminum-coated plastics which winds around a circular cylindrical electrode when a voltage is applied between the sheet and the electrode. Thus, the appearance of the device varies depending on whether the sheet is rolled around the electrode or not. The current consumption is very low but is continuous in one of the states.

It is also known to construct dielectric materials bearing permanent electric charges and known as "electrets." These materials are usually in the form of thin colorless transparent flexible sheets made of a plastics having very high resistivity, e.g. polypropylene. The sheets are permanently charged, e.g. by subjecting them to a corona discharge or implanting ions or electrons, using a particle accelerator. The charges thus implanted in the materials are secured therein for a very long period (e.g. 100 years) owing to its very high resistivity.

It has been discovered that a piece of electret tends to adhere to electrically conducting materials because of the electrostatic attraction between the charges it bears and the charges induced thereby in the conducting material.

This property has been used to construct an electrically-actuated switching device disclosed in U.S. patent application No. 643,645 filed on behalf of the assignee herein on Dec. 23, 1975 and now allowed.

SUMMARY OF THE INVENTION

In accordance with the present invention, there is provided a reflecting electrostatic display cell for presenting under the control of an external temporary electric control signal two stable configurations, said cell comprising:
a dihedral block having two surfaces departing from an edge;
two electrodes extending onto respectively said two surfaces;
an electret device secured to said edge, and
means for applying said external temporary electric control signal to said electrodes.

For a better understanding of the invention, and to show how the same may be carried into effect, reference will be made to the ensuing description and to the attached figures among which:

DESCRIPTION OF THE PREFERRED EMBODIMENTS

Figure 1:
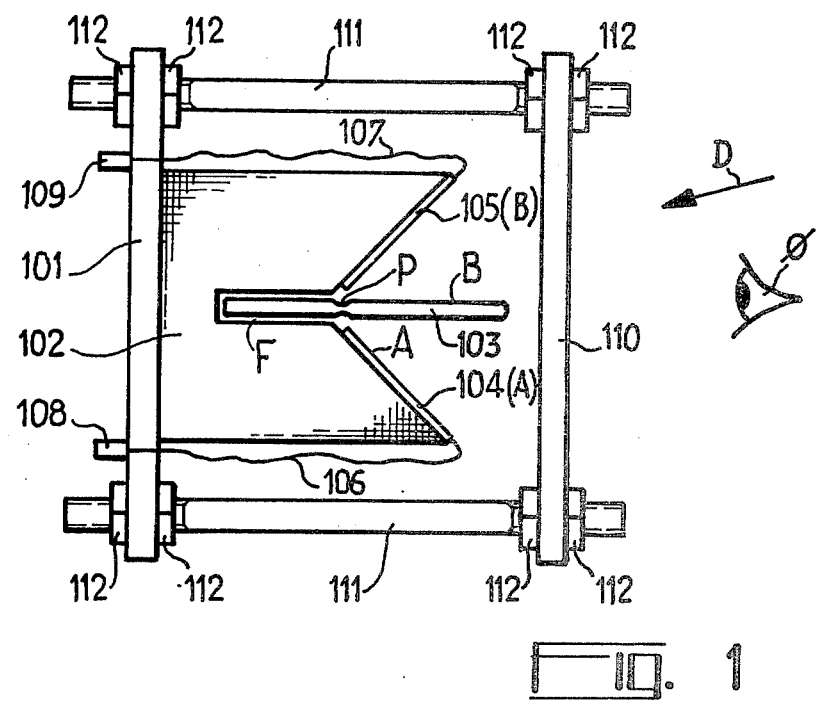
FIG. 1 illustrates a display cell according to the invention.

FIG. 1 illustrates a cell comprising a base 101, a dihedral block 102, a sheet of electret 103, two electrodes 104, and 105, two connections 106 and 107, two terminals 108 and 109, a glass plate 110, columns 111 and nuts 112.

The dihedral block 102 is secured to the base 101 and has a dihedral notch, the dihedral angle being approximately 90° in the described example, on the side remote from the holder and facing glass 110, the incident light D and the observer's eye $\phi$. A slot F is formed in block 102 and extends inwards from the dihedral edge. It is used to secure the electret sheet 103 in a substantially central position (when the sheet is not bent) relative to the dihedral angle. Slot F is just wide enough to slide in the electret, which is secured with a drop of glue (not shown).

Block 102 is not conductive and bears electrodes 104 and 105, one electrode being disposed on each dihedral surface. Electrodes 104 and 105 are connected to terminals 108 and 109 respectively by conductors 106 and 107, which are shown detached from the block in order to simplify the drawing, but can be stuck to the lateral surfaces or extend through internal apertures.

Electrodes 104 and 105 the electrodes are made of a conducting paint having a first color A for electrode 104 and a second and different color B for electrode 105. Since the control current is extremely small (a few tens of nA's) the resistivity of the electrodes can be high, so that a large number of different colors can be chosen, since the quality and the proportion of the conducting agent are of little importance. Other embodiments are possible, e.g. a layer of paint covered with a transparent electrode.

Depending upon the stable state selected, electret 103 tends to stick to a surface of the dihedron. The electret is painted with a different color on each surface, preferably the same colors as the facing electrodes. Thus, the surface facing electrode 104 is painted with color A and the surface facing electrode 105 is painted with color B.

When the electret sticks to surface 105 and the device is illuminated by external light, e.g. along direction D, the observer $\phi$ sees the dihedron reflecting a uniform color A. Conversely, when the electrode sticks against surface 104, the observer sees the dihedral blocking reflecting a uniform color B.

The device, which operates by electrostatic means, is sensitive to various external agents such as dust which may accumulate thereon. The glass plate 110 secured to base 101 by columns 111 and nuts 112 gives protection in co-operation with a lateral cap system (not shown) which is used when the device is used by itself, without adjacent cells.

Figures 2, 3:
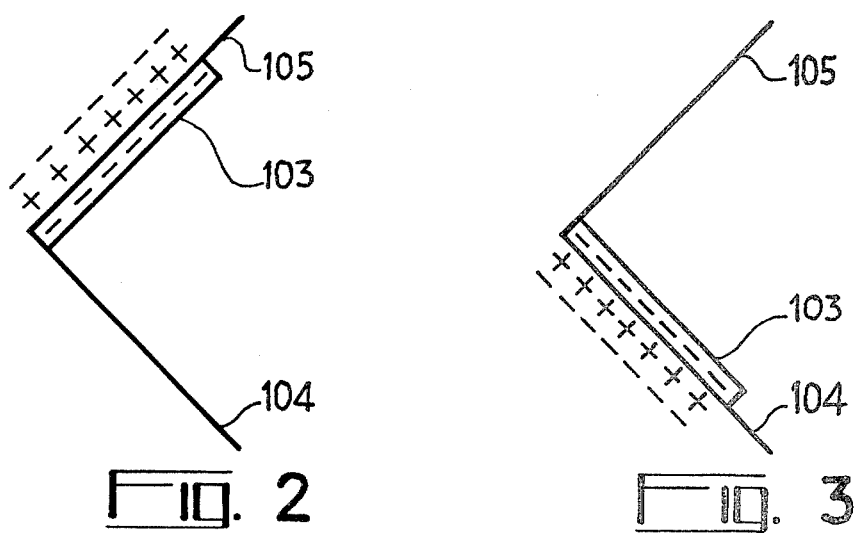
FIGS. 2 and 3 diagrammatically illustrate the active parts of said cell in its two separate and distinct stable states.

FIG. 2 diagrammatically shows one of the two stable states of the cell shown in FIG. 1, whereas FIG. 3 shows the other stable state. In each of the aforementioned states, no external voltage is necessary. If electret 103 is negatively charged (as in the drawing) it induces a positive surface layer in the electrode against which it sticks, and a deeper negative layer in the same electrode, the negative layer being necessary in order to maintain the electric neutrality of the conductor, which is not connected to an external source of voltage. The attraction between the negative charges of the electret and the positive charges of the electrode is greater than the repulsion between the negative charges of the electret and the negative charges of the electrode, since the negative charges of the electrode are farther from the electret than are the positive charges; consequently the electret remains stuck againts the electrode. Electrode 104 can assume a similar charge pattern to that of electrode 105. In order to change from one state to the other, the electret must be released from one electrode and attracted by the other. To this end, a voltage supply is connected between the electrodes via terminals 108 and 109 so that, in the case of a negative electret, the electrode to which electret 103 adheres is charged negatively whereas the other electrode is charged positively.

It is advantageous to be able to use the cell when its dihedral edge is in any positional orientation, e.g. a horizontal position, assuming that the electrostatic attraction is greater than the gravity force on the electret. Experience shows that conventional electrets have an adhesive force about ten times that of gravity, and that the method described hereinafter for reducing the control voltage leaves a wide safety margin from gravitational forces.

The voltage to be applied between the electrodes in order to change one stable state for another is somewhat high. In the case of the previously-described structure, this voltage depends on the electret charge density, the dihedral angle and the length of the electret perpendicular to the dihedral edge. The width parallel to the edge is unimportant. At a density $\sigma = 10^{-10}$ C/cm$^2$, an angle of 30° and a length of 1 cm, the voltage is substantially 500 V, which is still consistent with transistor control.

A particularly interesting dihedral angle is 180°, i.e. a flat structure which is the most clearly visible, more particularly at high incidence angles. In that case the control voltage is 3000 V, so that transistors cannot be used in the present state of technology.

It is therefore necessary to use various methods of reducing the control voltage.

The first method is to reduce the bending forces at the fold in the electret. To this end, the sheet of electret is made thinner at the fold, as shown by groove P in FIG. 1. It can be made thinner, e.g. by locally heating the plastics with a resistive wire through which an electric current flows, and by pulling the electret. The resulting contraction in cross-section can exceed 300% before breakage, and the thus-formed pivot has a negligible torque but is very long-lasting.

The second method is to distribute the charges in non-uniform manner in the electret, since the electret should advantageously come loose from the electrode surface when all points have substantially the same voltage. A dihedral block comprising two electrodes behaves like a capacitor in which the electric field decreases from the edge outwardly in proportion to 1/r. Consequently, if the forces acting on the electret are to be uniform at every point, the charge distribution must increase from the edge outwardly in linear manner. In the numerical example given above, if the electrodes begin at 1 mm from the dihedral edge (they must in any case start at a limited distance in order to avoid an excessive field), the resulting charge density increase from $10^{-10}$ C/cm$^2$ at 1 mm from the edge to $10^{-9}$ C/cm$^2$ at 1 cm from the edge. This range of variation is quite practicable since the top value is limited to approx. $10^{-8}$ C/cm$^2$ owing to neutralization by the free charges of the electret and the bottom value is limited to approx. $10^{-11}$ C/cm$^2$ owing to the low reproducibility due to stray charges before the electret charging operation. Various methods are used to obtain the aforementioned linear distribution. For example, the electret can be given a corona discharge via a plurality of pins which number of pins increases towards the region where the charge must be highest; the approximation is rough but sufficient. Alternatively, the electret can be charged by direct implantation of ions or electrons, using, e.g. an electronic masking apparatus. In such an apparatus the flux of charges can be adjusted, the main methods for this being action on the beam intensity or on the duration of scanning. The resulting distribution can be much closer to the optimum distribution than when the corona effect is used.

Another method includes preventing the electret from sticking on the electrode and keeping it at a distance of a few microns (approx. 10–20) therefrom. To this end, shims are disposed between the electret and the electrode. The shims may advantageously be formed on the electrode itself, which then has the shape of a grid.

Advantageously, the spacing is produced by using a dielectric layer having high permittivity. The resulting modification in the electric field reduces the force of attraction between the electret and the electrode and correspondingly reduces the control voltage. For example, a layer of PVF$_2$ approximately 20 μm thick with $\sigma_r = 10$ can be used in the aforementioned cell to obtain a control voltage of approx. 150 V, which is quite compatible, e.g. with control means used for plasma panels.

Finally, the average charge on the electret can be reduced while retaining a local charge between $10^{-9}$ and $10^{-10}$ C/cm$^2$, by producing a pattern, preferably by direct implantation, the pattern comprising charged regions and non-charged regions.

As we have seen, the electret should have two differently colored surfaces. It is very difficult to paint an electret, particularly to paint both surfaces simultaneously, since the solvent in the paint tends to dissolve the surface layer containing the charges, which are thus neutralized. Thus a solvent inert towards the electret material must be used and the resistivity of the pigments must be selected so as not to decrease the resistivity of the electret.

Figure 4:
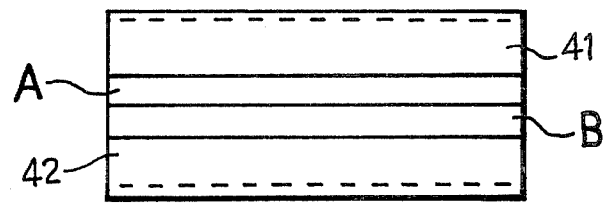
FIGS. 4, 5 and 6 illustrate cross-sections through a composite electret sheet.
Figure 5:
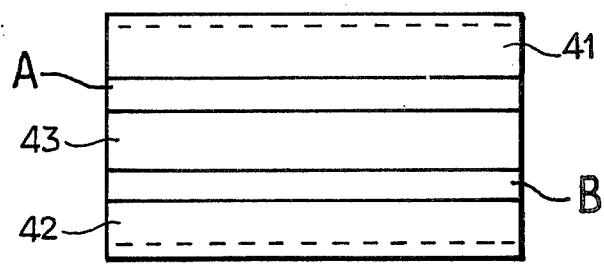
Figure 6:
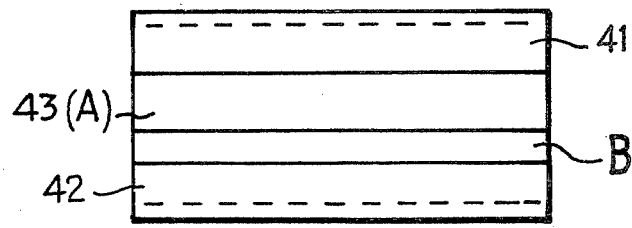

However, the best results are obtained by painting only one surface, during which painting operation the other surface is protected from the solvent vapours, thus retaining the charges on the non-painted surface. This produces only one color, which can be seen from both sides since the electret material is usually transparent. In order to obtain two colors, it is necessary to stick two electrets back to back, the electrodes being painted different colors and the painted surfaces being placed together so that the solvent in the adhesive does not damage the electret. FIG. 4 shows a structure of the kind in question, comprising two electret sheets 41, 42 and two layers of paint A and B. In another embodiment, shown in FIG. 5, an intermediate sheet 43 is painted and the electrets are secured thereto. In another embodiment (FIG. 6) the intermediate sheet is naturally colored or reflecting, e.g. in the case of a metal sheet, and requires only one layer of paint.

The resulting display cell can have various shapes when seen from the front. Two particular shapes (the square and the rectangle) can be used to construct display devices having complex shapes, wherein the elementary units are a set of preferably identical cells.

In the particular case of an alpha-numerical display, it is known that all the Roman letters and the arabic figures can be made up from a matrix having seven lines each including five squares. In this manner, an alpha-numerical display unit can be constructed from 35 square display cells each cell according to the invention. Another, more aesthetic method involves a matrix of 9 lines and 7 columns, i.e. 63 cells.

Figure 7:
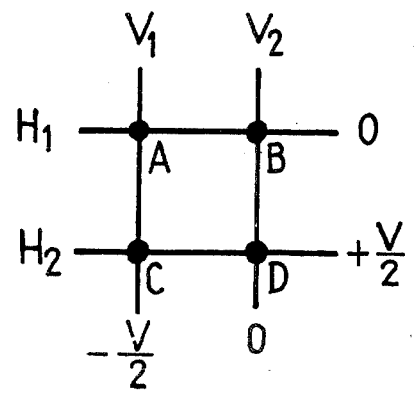
FIGS. 7 and 8 diagrammatically illustrate matrix control systems.

The matrix can be controlled cell by cell, using two connections per cell, but the number of connections can be reduced by a matrix control system, a small-scale example of which is shown in FIG. 7. Points A, B, C, D represent the cells arranged in two columns $V_1$, $V_2$ and two lines $H_1$, $H_2$. Two voltages sources are required, i.e. $+V/2$ and $-V/2$ (these being the cell control voltage). In order to switch cell C, for example, the voltage $+V/2$ is applied to line $H_2$ and the voltage $-V/2$ is applied to line $V_1$ in accordance with the desired position. As a result, cell C is acted upon by voltage V and changes state. Cells A and D are subjected to voltages having the absolute value $V/2$, and cell B is not subjected to any voltage. Consequently, cells A, B and D do not change state.

Figure 8:
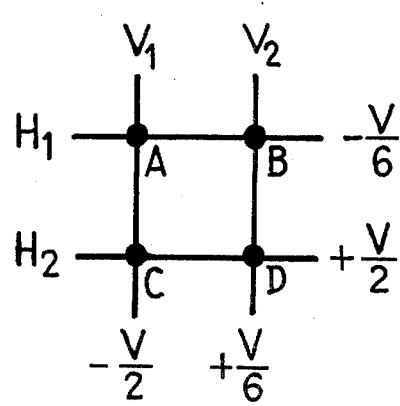

Another control system, shown in FIG. 8, includes non-switched cells subjected to a voltage having an absolute value of only $V/3$. This allows a wider scatter in the control voltages of the various cells, resulting in less narrow manufacturing tolerances. As FIG. 8 shows, only cell C is subjected to voltage V, whereas the three other cells are subjected to a voltage having an absolute value $V/3$.

In the more special case of numerical display, it is advisable to use a standard "seven segments" breakdown and to construct a unit numerical display device from only seven rectangular display cells.

The invention is not limited to displaying two colors, but can be used for displaying any two structures which can be visually distinguished, e.g. a reflecting surface as opposed to a black surface or a pattern which is different for each state.

Figure 9:
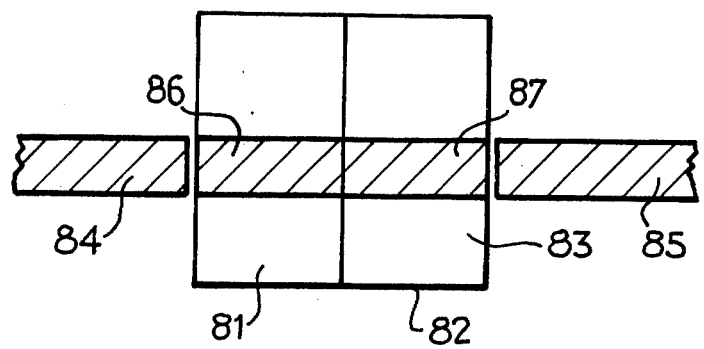
FIGS. 9 and 10 diagrammatically illustrate a particular display device.
Figure 10:
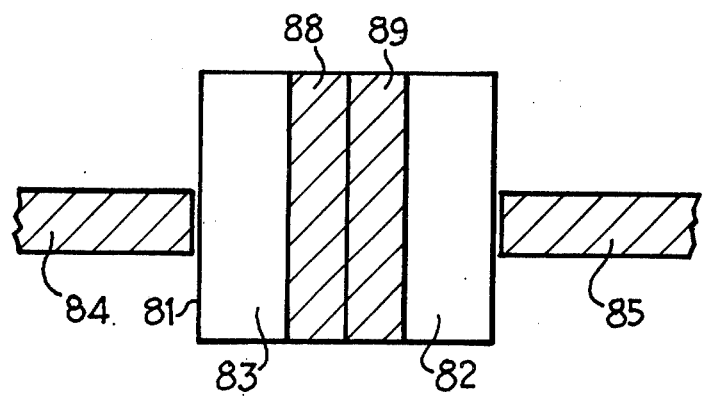

FIGS. 9 and 10 are plan views based on the last-mentioned feature, showing a device for displaying the state of a cutoff means, e.g. a valve in a synoptic control board of a refinery. FIG. 9 shows a device comprising an electrode 81 on the left and an electrode 82 covered with an electret 83 on the right. The shaded regions 84, 85 outside the device form part of the synoptic board. The valve is symbolically shown in the open state, by means of the shaded strip 86, 87 drawn on electrode 81 and on one surface of electret 83. FIG. 10 shows the same device in its other stable state, wherein electrode 83 covers electrode 81. The shaded strips 88, 89 on the other surface of electret 83 and on electrode 82 symbolically represent the closed position of the valve.

What we claim is:

1. A reflecting electrostatic display cell for presenting under the control of a control signal two stable configurations, said cell comprising:
   a dihedral block having two dihedral surfaces departing from a dihedral edge;
   two electrodes extending onto respectively said two dihedral surfaces;
   an electret member having a permanently applied electrostatic charge secured to said edge; and
   means for electrically coupling said control signal to said electrodes.

2. A display cell as recited in claim 1, wherein said electret member comprises two electret sheets; each of said electret sheets having one painted face and being glued along said painted face onto the other of said electret sheets.

3. A display cell as recited in claim 1, wherein said electret member includes an intermediate sheet having two painted faces, and two transparent electret sheets glued respectively onto said painted faces.

4. A display cell as recited in claim 1, wherein said electret member includes an intermediate sheet fabricated from a colored material and having a painted face and a non-painted face and two transparent electret sheets glued respectively onto said painted and non-painted faces.

5. A display cell as recited in claim 1, wherein said electret member has an electrical charge density the magnitude of which increases along a direction perpendicular to said dihedral edge substantially linearly with respect to the distance from said dihedral edge.

6. A display cell as recited in claim 1, wherein said electret member has an electrical charge density substantially equal in magnitude to $5 \times 10^{-9}$ C/cm$^2$.

7. A display cell as recited in claim 5, wherein said electrical charge density has an average magnitude of substantially $5 \times 10^{-9}$ C/cm$^2$.

8. A display cell as recited in claim 1, further comprising shims extending onto said electrodes for preventing said electret member from touching said electrodes.

9. A display cell as recited in claim 1, wherein said electrodes have a grid shape adapted to allow a reduction of the magnitude of the voltage of said control signal while preserving said two stable configurations.

10. A display cell as recited in claim 1, further comprising a layer of a high permittivity transparent dielectric material extending onto said electrodes adapted to allow a reduction of the magnitude of the voltage of said control signal while preserving said two stable configurations.

11. A display cell as recited in claim 1, wherein said dihedral block has a dihedral angle substantially equal to 30°.

12. A display cell as recited in claim 1, wherein said dihedral block has a dihedral angle substantially equal to 90°.

13. A display cell as recited in claim 1, wherein said dihedral block has a dihedral angle substantially equal to 180°; whereby said cell presents a flat observation face having maximum display angle.

14. A display cell as recited in claim 1, wherein said electret member has a length perpendicular to said dihedral edge substantially equal to 1 cm.

15. A display cell as recited in claim 1, wherein one of said electrodes has a first color and the other one of said electrodes has a second color; said electret member having a first face having said first color and a second face having said second color, whereby one of said two stable configurations appears to an observer to have said first color and the other one of said two stable configurations appears to an observer to have said second color.

16. A display cell as recited in claim 1, wherein one of said configuration appears to an observer like a first picture, and the other one of said configurations appears to an observer like a second picture.

* * * * *